C. HENTHORN & W. T. WEHE.
EMERGENCY AXLE EXTENSION.
APPLICATION FILED JULY 16, 1914.
1,139,182.
Patented May 11, 1915.
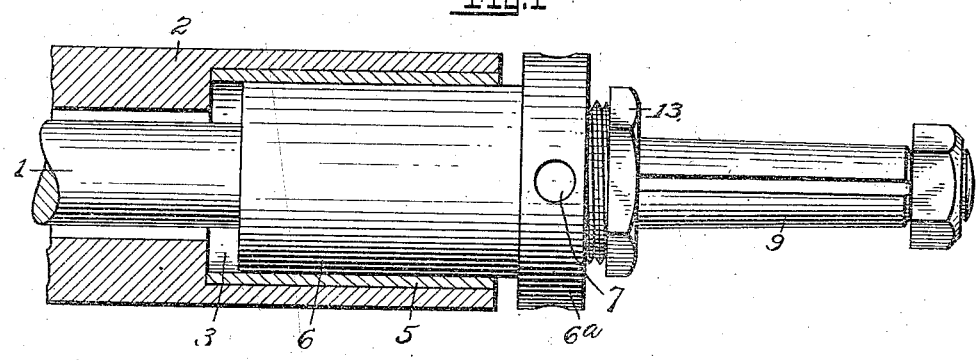
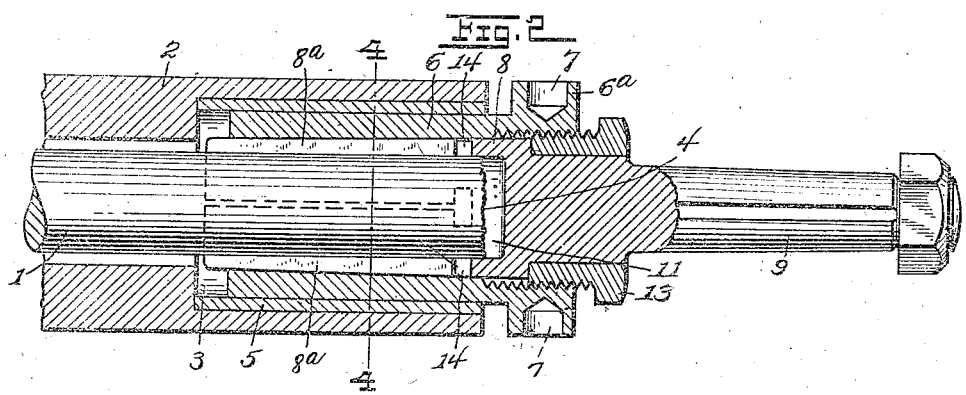
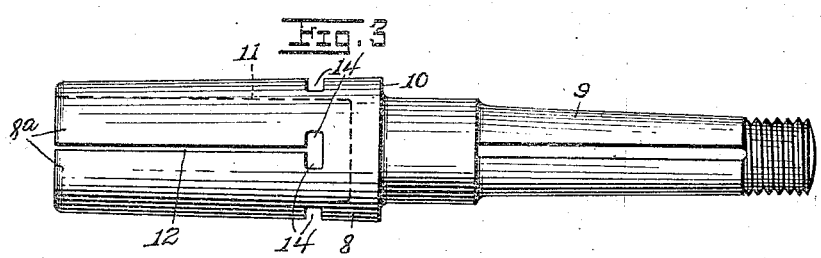
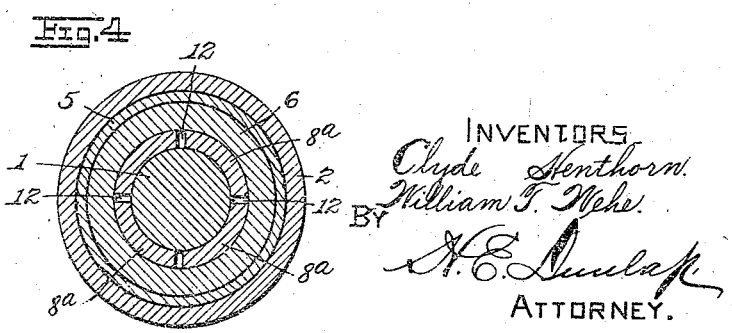
WITNESSES:
INVENTORS
Clyde Henthorn.
William T. Wehe.
BY
H. E. Dunlap
ATTORNEY.

UNITED STATES PATENT OFFICE.

CLYDE HENTHORN AND WILLIAM T. WEHE, OF BELLAIRE, OHIO.

EMERGENCY AXLE EXTENSION.

1,139,182.  Specification of Letters Patent.  Patented May 11, 1915.

Application filed July 16, 1914. Serial No. 851,403.

*To all whom it may concern:*

Be it known that we, CLYDE HENTHORN and WILLIAM T. WEHE, citizens of the United States of America, and residents of Bellaire, county of Belmont, and State of Ohio, have invented certain new and useful Improvements in Emergency Axle Extensions, of which the following is a specification.
This invention relates broadly to emergency axle extensions for automobiles, and specifically to an emergency spindle.

The primary object of the invention is to provide a wheel spindle adapted to temporarily replace a spindle broken from the axle of an automobile and having means whereby it may be readily attached to or clamped upon the broken axle in such manner that the disabled car may be driven under its own power in the usual manner, thus enabling such car to proceed without assistance to a point where permanent repairs can be made.

A further object is to provide a device of the character mentioned which may be conveniently carried in a car for emergency use and which may be readily applied when occasion requires.

With these and other minor objects in view, the invention resides in the features of construction, arrangement of parts and combinations of elements which will hereinafter be fully described, reference being had to the accompanying drawings, forming a part of this specification, in which—
Figure 1 is a side elevation of the invention applied to an axle, the axle housing being shown in section; Fig. 2 is a longitudinal section of the same; Fig. 3 is a side elevation of the axle-clamp with its integral spindle;
and Fig. 4 is a cross section on line 4—4, Fig. 2.

Referring to said drawings, in which like designating characters distinguish like parts throughout the several views—1 indicates an axle of a common type, which is rotatably mounted within a stationary housing 2, the latter having in its end the usual internal annular recess or socket 3 for the accommodation of the roller bearings commonly employed in axles of this character. The said axle 1 is herein depicted as broken at a point 4 closely adjacent to the end of the housing 2, experience having demonstrated the fact that the more or less frequent breaks to which this type of axle is specially liable usually occur at or near this point.

Closely fitted in the socket 3 in the axle housing 2, from which the roller bearing has been removed, is a bushing 5, composed of bronze or other suitable metal, and fitted within said bushing so as to be rotatable in the latter is the cylindrical body portion of a hollow sleeve-like bearing member 6 having a flanged outer end 6ª which is preferably provided with a plurality of radially directed sockets 7 adapted for receiving a tool whereby withdrawal of the bearing may be accomplished when occasion requires. The interior walls of said bearing member 6 are inclined slightly with respect to its axis, the bore of said member having an inwardly tapered form, and closely embraced by said walls is a flexible clamp, which is disposed in close gripping relation to the axle 1, as is clearly shown in Figs. 2 and 4. Said clamp comprises a body portion 8 having an axially alined wheel spindle 9 formed integral therewith at its outer end, an annular outwardly-facing shoulder 10 being provided at the junction of said spindle with said body portion for a purpose which will presently be made apparent. The body portion 8 has a cylindrical bore 11 therein in which the end of the broken axle 1 is received, as shown in Fig. 2. The said body portion 8 is slightly tapered exteriorly in an inward direction to substantially correspond with the form of the bore in the bearing member 6 by which it is embraced, as aforesaid. A plurality of longitudinal slits 12 are provided in said body portion to form a plurality of resilient clamping fingers 8ª which are adapted to be forced into close binding or clamping relation with the axle 1 when said body portion is forced inward with respect to the bearing member 6.

For forcing the parts into positions wherein the clamping fingers bind upon or grip the axle, a gland 13 having its inner end seated against the shoulder 10 of body portion 8 is threaded within the outer end of the bearing member, said gland being adapted to simultaneously force the clamp inward and draw the bearing member outward in a manner which will be readily understood.

If desired, the resiliency of the fingers 8ª may be increased as by the provision of weakening notches 14 or the like at suitable points, as shown in Figs. 2 and 3.

The application of the device herein described may be quickly accomplished by unskilled persons without the use of other tools than an ordinary wrench, the usual manner of applying being as follows: The usual roller bearing having been withdrawn, the bushing 5 is driven into the socket 3 of the axle housing, after which the bearing member 6 is slipped within said bushing to a seated position. Then the clamp 8 is slipped within the bore of said bearing member and over the broken end of axle 1 until it begins to bind, whereupon the gland 13 is slipped by hand over the spindle 9 until its threads begin to engage those of said bearing member, after which a wrench is applied to said gland and the latter is moved as far as it will go. The broken spindle having been removed from the hub of the wheel, the latter may be applied to the substitute spindle 9 in the usual way.

What is claimed is—

1. An emergency axle extension comprising a member having a plurality of parallel flexible fingers disposed about a central axle-receiving bore, said member having an integral axially alined spindle, a bearing member embracing said fingers, and means rotatably mounted on the inner end of said spindle and having threaded connection with said bearing member whereby the latter is actuated to exert pressure on said fingers for causing the latter to grip an axle received in said bore.

2. In a device of the character described, the combination with an axle and axle housing, of a hollow clamping member slotted to form resilient fingers mounted on the end of the axle, said member having an integral axially alined spindle adapted for the reception of a wheel hub, a cylindrical bearing member disposed in embracing relation to said fingers, said bearing member being rotatably mounted within the end of said housing, and means independent of the wheel hub whereby said clamping member and said bearing member are moved relatively for causing said fingers to grip said axle.

3. In a device of the character described, the combination with an axle and axle housing, of a hollow clamping member having an inwardly tapered exterior and having an integral axially alined spindle for the reception of a wheel hub, said member being slotted to form a plurality of fingers and being mounted upon the axle with said fingers embracing the latter, a cylindrical bearing member having an inwardly tapered bore disposed in embracing relation to said fingers and being rotatable within said housing, and means threaded within said bearing member and exerting inwardly directed pressure against said clamping member whereby the fingers of the latter are caused to grip said axle.

4. In a device of the character described, the combination with an axle and axle housing, of a hollow clamping member having an inwardly tapered exterior and having an integral axially alined spindle, said member being slotted to form a plurality of fingers and being mounted upon the axle with said fingers embracing the latter, a cylindrical bearing member having an inwardly tapered bore disposed in embracing relation to said fingers and being rotatable within said housing, and a gland in threaded engagement with said bearing member, said gland having its inner end seated against said clamping member and being adapted to exert a force whereby said bearing member and said clamping member are relatively moved longitudinally in opposite directions for causing said fingers to grip said axle.

In testimony whereof we affix our signatures in presence of two witnesses.

CLYDE HENTHORN.
WILLIAM T. WEHE.

Witnesses:
J. S. PORTER,
W. F. KEEFER.